(12) United States Patent
Reutter

(10) Patent No.: US 7,258,604 B2
(45) Date of Patent: Aug. 21, 2007

(54) DEVICE AND METHOD FOR THE ORDERED DEPOSITION OF PARTED SAUSAGE PORTIONS

(75) Inventor: Siegfried Reutter, Eberhardzell (DE)

(73) Assignee: Albert H. Handtmann Maschinenfabrik GmbH & Co. KG, Biberach/Riss (DE)

( * ) Notice: Subject to any disclaimer, the term of this patent is extended or adjusted under 35 U.S.C. 154(b) by 8 days.

(21) Appl. No.: 11/400,415

(22) Filed: Apr. 7, 2006

(65) Prior Publication Data

US 2006/0240754 A1    Oct. 26, 2006

(30) Foreign Application Priority Data

Apr. 11, 2005  (EP)  ................................. 05007894

(51) Int. Cl.
*A22C 11/00* (2006.01)
(52) U.S. Cl. ...................................................... 452/30
(58) Field of Classification Search ................ 452/21, 452/22, 30–32, 35–37, 46, 51; 198/370.03, 198/370.01, 370.09, 370.05; 99/326–331, 99/352–355, 386, 400, 407, 443 R, 443 C, 99/467, 468, 477–479, 486, 487, 516; 53/444, 53/76, 285, 409, 148
See application file for complete search history.

(56) References Cited

U.S. PATENT DOCUMENTS

| 4,747,767 | A | 5/1988 | Schnell |
| 6,645,062 | B1 | 11/2003 | Buckles |
| 6,647,867 | B2 * | 11/2003 | Ahlberg ........................ 99/360 |
| 6,845,860 | B1 * | 1/2005 | Walker ........................ 198/433 |
| 7,048,622 | B2 * | 5/2006 | Shefet et al. .................. 452/32 |
| 7,069,845 | B2 * | 7/2006 | Righele ........................ 99/486 |

FOREIGN PATENT DOCUMENTS

| DE | 4410391 | 9/1995 |
| EP | 0093037 | 11/1983 |

* cited by examiner

*Primary Examiner*—Thomas Price
(74) *Attorney, Agent, or Firm*—Marshall, Gerstein & Borun LLP

(57) ABSTRACT

In order to be able to accept single sausage portions after leaving the filling machine and to be able to deposit them in an ordered manner with respect to quantity and position, an acceleration device for accepting the sausage portions from a filling machine in a row and for conveying them further, and a transfer device for pushing the single sausage portions sideways from the acceleration device at defined positions.

20 Claims, 4 Drawing Sheets

DEVICE AND METHOD FOR THE ORDERED DEPOSITION OF PARTED SAUSAGE PORTIONS

CROSS-REFERENCE TO RELATED APPLICATION

The present application claims the benefit of priority of European Patent Application No. 05007894.8 filed on Apr. 11, 2005. The entire text of the priority application is incorporated herein by reference in its entirety.

FIELD OF THE DISCLOSURE

The disclosure relates to a device and a method for the ordered deposition of parted sausage portions.

BACKGROUND OF THE DISCLOSURE

During the fully automatic production of sausages, normally filling machines are used which determine the sausage geometry with regard to length, weight and caliber. Here the term "filling machine" comprises the complete sausage-producing unit, consisting of vacuum filler, twist-off unit, length unit including the parting unit.

Numerous filling machines possess a parting device to subdivide the produced sausage skein into individual sausage portions, i.e. single sausages or chains of sausages with a predetermined number. Once the subdivided sausage portions have left the filling machine, they lie without arrangement on the table provided for them or on a conveyor belt. A conveyor belt can, for example, serve as a feeder for higher level systems, such as a freezing tunnel or cooking equipment.

If sausage portions are transferred onto a table or onto a conveyor belt in a disarranged manner, they must be placed into a suitable package involving increased manual work in sorting. With a disarranged transfer into a freezing tunnel or continuous-flow cooking system optimum distribution cannot occur, because the sausages lie over one another randomly. Consequently, the maximum throughput through the following processing equipment is not achieved.

SUMMARY OF THE DISCLOSURE

It is therefore the object of the disclosure to provide a device and a method of accepting the individual sausage portions after leaving the filling machine and to place them ordered with regard to quantity and position.

According to the disclosure the individual sausage portions can be placed in a row ordered with respect to quantity and position. Thus, the maximum throughput through the following processing equipment can be achieved. In this connection the expression parted sausage portion means single sausages separated from one another or chains of sausages with a certain number of sausages.

According to the disclosure parted single sausage portions, i.e. either single sausages or sausage chains with a certain number of sausages can be accepted from the filling machine and conveyed further in the transport direction.

If, for example, the individual sausage portions are at least partially conveyed further at a higher speed than the transport device of a filling machine which conveys the sausage portions, then a gap forms between the individual sausage portions. Each gap provides exact positioning of the individual sausage portions, so that then a transfer device can push the individual sausage portions unerringly sideways from the accelerating device. The sausage portions can then be accurately transferred either to a magazine or to a further conveyor belt or tray, etc. The accelerating device can, for example, comprise an accelerating belt which either runs faster than a filling machine transport device or briefly runs faster with the transfer of a sausage portion or a separation point between two sausage portions. It is thus ensured that the individual sausage portions exhibit a defined spacing, i.e. a gap with respect to one another.

Preferably, the accelerating device comprises a side guide so that the individual sausage portions are aligned in the transport direction of the accelerating device, which in turn provides an exact alignment of the individual sausage portions.

According to a preferred embodiment the transfer device comprises a rotary transfer vane on the shaft of which at least one carriage plate is mounted which pushes the sausage portions sideways from the accelerating device. This type of rotary transfer vane device is easy to produce and can push the sausage portions in a reliable and simple manner sideways from the accelerating device, i.e. from the accelerating belt.

It is advantageous if a baffle plate, which extends essentially perpendicular to the transport direction, is located on the rear end of the carriage plate in the transport direction. Due to the baffle plate integrated into the rotary transfer vane, the position of the sausage portion, which is to be pushed from the accelerating device, is precisely defined, because the individual sausage portion runs up to the baffle plate and can therefore assume an exactly predefined position.

In an advantageous manner the carriage plates and baffle plates are mounted interchangeably, preferably pluggable, on the shaft of the transfer device. The fitted equipment depends on the grouping application and can be arranged flexibly by simply changing the number of carriage plates and baffle plates and the length of the carriage plates. Thus, the set-up of the device can be changed easily, quickly and economically.

The number n of carriage or baffle plates corresponds to the number n of the sausage portions n, which are transferred consecutively in a row by the transfer device from the accelerating belt, wherein the carriage plates are spread consecutively uniformly around the circumference of the shaft in the transport direction. Thus, the individual sausage portions can be pushed one after the other from the accelerating device by simple rotation of the rotary transfer vane, wherein the rotary transfer vane in each case turns one division further. This means that if n sausage portions are to be transferred in a row, from n sausage portions arriving consecutively on the accelerating device initially the first incoming sausage portion n1 is pushed sideways at a first position on the accelerating device and then the nth incoming sausage portion is pushed from the belt at an nth position, which is located before the termination of the n-1th position in the transport direction of the acceleration device.

It is advantageous if a sensor, which detects the presence of a sausage portion in the area of the carriage plate, i.e. at the n places, is provided for each carriage plate.

According to a preferred embodiment the sausage portions are transferred from the accelerating device first to a magazine. Preferably, this magazine is a drum magazine, which comprises a number of longitudinal grooves for the accommodation of the sausage portions around its circumference. This has the advantage in that the drum magazine can be positioned very closely above the further conveyor belt or acceptance trays. Due to the short transfer path, the sausage portions are transferred in a controlled manner and are only subjected to a free fall over a very short distance.

Following the transfer device, a further conveyor belt can be arranged, which moves perpendicular to the transport direction of the accelerating device and moves the transferred individual sausage portions for further treatment, packing, etc.

If n sausage portions are to be transferred in a row, preferably n sausage portions are pushed from the accelerating device onto a longitudinal groove on the drum magazine, after which the drum magazine rotates to deposit the n sausage portions, whereby after the rotation a new longitudinal groove is ready for accepting the next sausage portions. The invention is explained below with reference to the following drawings.

According to a preferred embodiment the carriage plate of the rotary transfer vane is formed from a number of carriage plate segments, which can be pushed onto the shaft, whereby one of the carriage plate segments can comprise a baffle plate. Due to plugging on a baffle plate and one or more carriage plate segments onto the shaft, the length of the carriage plate can be easily adapted to the length of the portion or to the desired deposition position.

DETAILED DESCRIPTION OF THE DISCLOSURE

Figure 1:
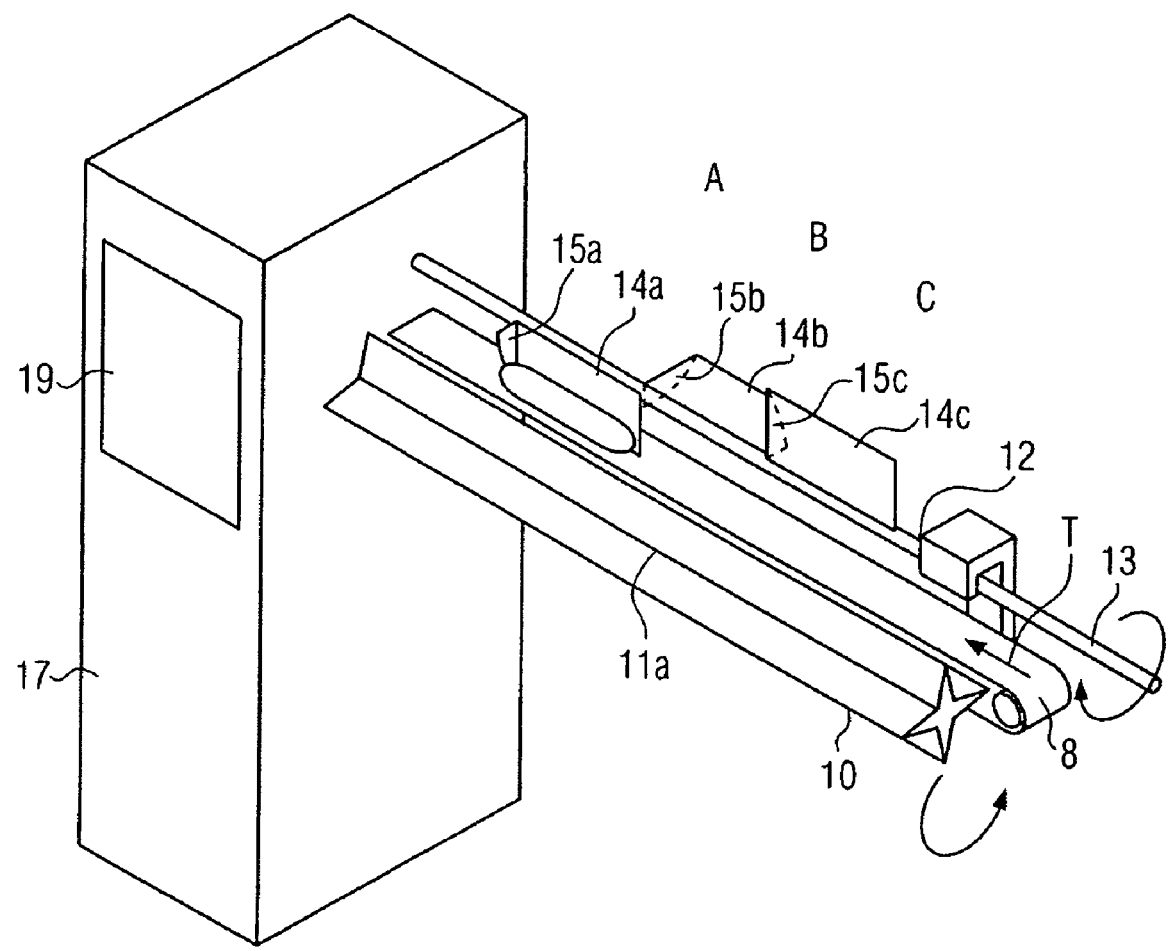
FIG. 1 shows a perspective illustration of a device according to the disclosure.
Figure 5:
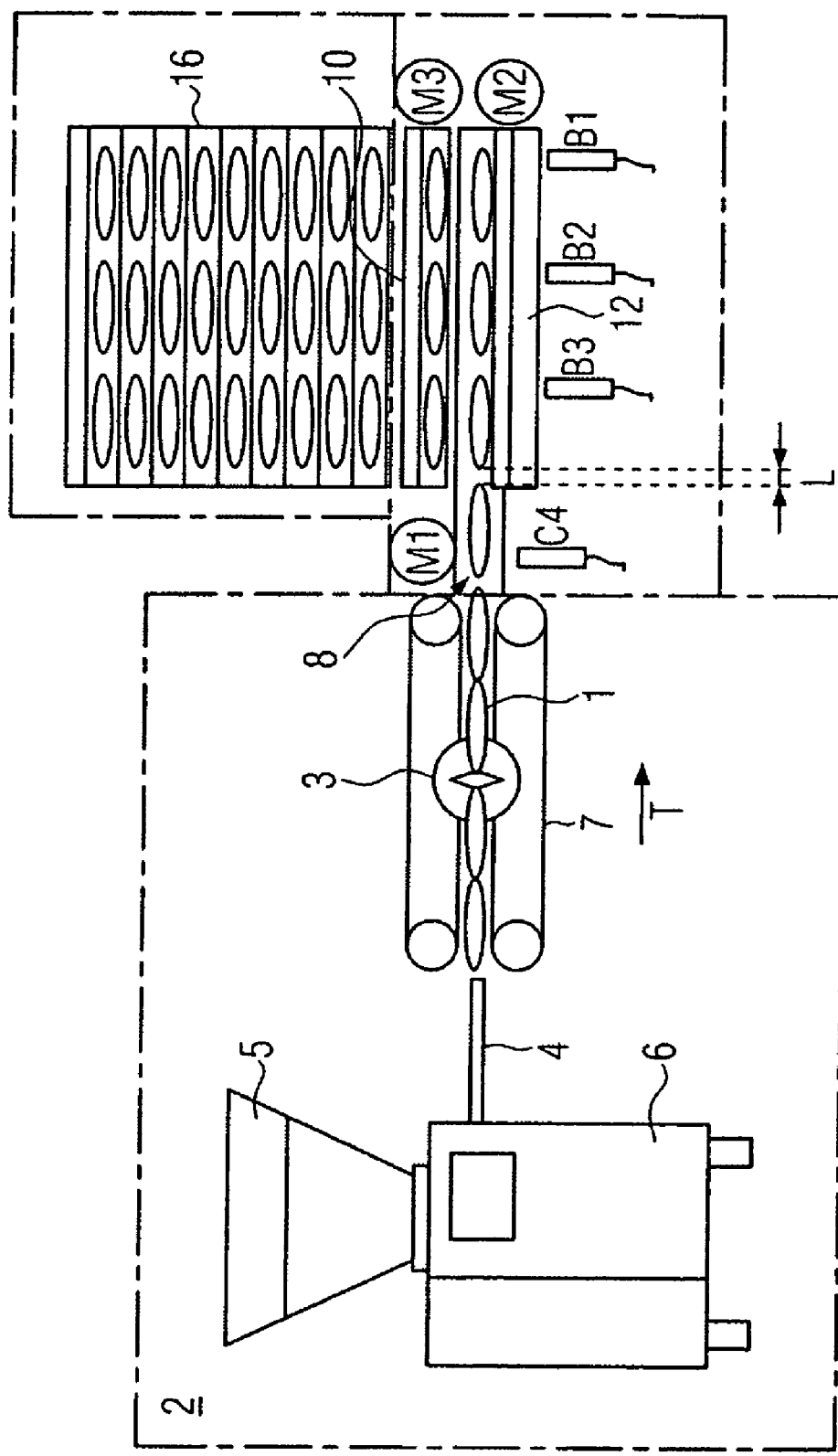
FIG. 5 shows schematically a device according to the disclosure following a filling machine.

FIGS. 1 and 5 show in a schematic manner the device according to the disclosure for the ordered deposition of sausage portions from a filling machine 2. Sausage portions 1 are here taken to mean either single sausages or chains of sausages with a certain number of single sausages. The term "filling machine" 2 comprises the complete sausage-producing unit consisting of the vacuum filler, 5, 6, 4, twist-off unit (not shown) as well as the length unit 7, which here serves as the transport device for the filling machine. The vacuum filler, as illustrated in FIG. 5, comprises in a known manner a filling hopper 5 for feeding paste filling material, such as for example sausage meat, and a conveyor device, e.g. a sliding-vane pump, for conveying the filling material into a filling tube 4, through which sausage sleeves are filled in a known manner with paste filling material and then for example divided up by displacement elements into single sausages and optionally also twisted off by a twist-off device. The single sausages thus produced can then be cut by a parting unit 3 into single sausage portions. The single sausage portions can, as explained, comprise single sausages or also chains of sausages with a certain number of single sausages. In the embodiment illustrated in FIG. 5 the joined sausages are subdivided into single sausages 1. In the embodiment illustrated in FIG. 5 the parting unit 3 is integrated into a length unit. The length unit comprises two circulating conveyor belts which hold the filled sausages and transport them in the transport direction T with a first velocity V1.

In FIG. 5 the parting unit 3 is shown integrated within the length unit 7. The parting unit 3 can however also be arranged after or before the transport device 7, i.e. the length unit 7.

Figure 4A:
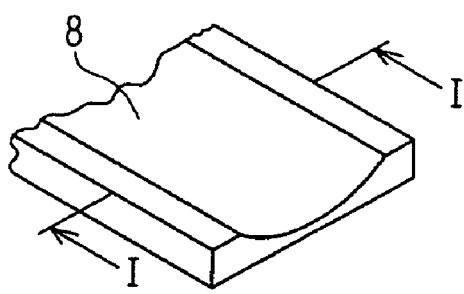
FIG. 4A shows a perspective illustration of an extract of an accelerating belt.
Figure 4B:
FIG. 4B shows a section along the line I-I of FIG. 4A.

The sausage portions coming from the filling machine 2 are accepted by the accelerating device 8, here the accelerating belt 8, and aligned in the transport direction T. The alignment can for example, as illustrated in FIGS. 4A and B, be realised by a side belt guide 9 which protrudes in the side regions of the belt 8.

Because the accelerating belt 8 moves at least sometimes faster than the transport device 7 of the filling machine 2, a gap 20 arises between the single sausage portions 1. Here, either the accelerating belt can move faster than the transport device 7 or the accelerating belt 8 can briefly run faster than the transport device 7 during the transfer of a sausage portion 1 or during the transfer of a parting point between two sausage portions 1, so that the single sausage portions 1 are drawn out from one another, so producing the gap 20. The length of the gap depends on the difference in velocity between the transport device 7 and the accelerating belt 8 and is, for example, 20 mm.

The accelerating device 8 or the accelerating belt 8 can be driven by the motor M1 illustrated in FIG. 5, which can be adjusted as required for rotational speed and for its dynamic behaviour. Also conceivable is a buffer roller conveyor with rollers braked intermittently from below for controlling the transport velocity. The accelerating device 8 is not restricted in its maximum length. The minimum length corresponds to the length of a sausage portion added to the length of the gap.

Furthermore, the device according to the disclosure, as can be seen from FIG. 5, comprises a sensor C4, which is arranged in the front section of the accelerating device 8 and detects a faulty sausage or sausage chain, so that it can be sorted out by a sorting device (air or motorised drive).

Another sensor can be provided (not illustrated) for detecting a parting point between two sausage portions, upon which the velocity of the accelerating belt is increased. The transition region or the parting point can however also be determined by the adjustment of the functions of the length unit or parting unit by the controller 6.

In this embodiment the gap is obtained by the closed-loop control of the velocity of the accelerating device, but the gaps can also be formed already before the transfer.

As can be seen from FIG. 1, the transfer device 12, which can push the single sausage portions 1 sideways from the accelerating device 8, is provided behind the accelerating device 8. As illustrated in FIG. 1, the transfer device is a rotary transfer vane 12. The rotary transfer vane 12 has the task of transferring the single sausage portions into a magazine 10, or alternatively, immediately onto a conveyor belt 16 or into an appropriate container, etc. (not illustrated).

In this embodiment the variable rotary transfer vane 12 comprises three carriage plates 14a, 14b, 14c. The three carriage plates 14 are used to push three sausage portions 1 arranged on the accelerating belt 8 consecutively sideways from the belt 8. The number n of the carriage plates 14 corresponds to the number of the sausage portions n, which are to be transferred consecutively in a row. The carriage plates 14 are in this embodiment fitted with baffle plates 15a, b, c, wherein the baffle plates 15a, b, c each extend essentially perpendicular to the transport direction T of the sausage portions 1, so that the conveyed sausage portions 1 can impinge against the baffle plates 15. The carriage and baffle plates 14, 15 are detachably mounted on a shaft 13, here pushed onto a shaft which is here a multi-sided shaft of the rotary transfer vane 12. The charging depends on the grouping application and is flexibly arranged by simply changing the number of baffle plates or carriage plates 14 and the length of the carriage plates. The length of a carriage plate preferably corresponds at least to the length of a sausage portion. The variable rotary transfer vane 12 can be driven by a servo drive or similar drive M2 that operates in steps (refer to FIG. 5).

Figure 2:
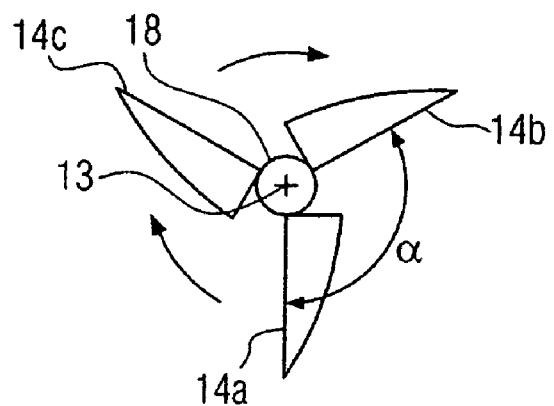
FIG. 2 shows a front view of the rotary transfer vane, whereby the baffle plates are not shown.

As can be seen from FIG. 2, the carriage plates and the baffle plates 14, 15 are distributed in the transport direction consecutively uniformly around the circumference of the shaft 13.

FIG. 2 shows the carriage plates 14, wherein the baffle plates 15 are not illustrated. This means that the carriage plates 14 are arranged at an angle α of 120° with respect to one another. With a larger number of sausage portions n the carriage plates 14 would then be arranged at an angle α of 360°/n with respect to one another. Such an arrangement ensures that for example a first carriage plate 14a is again in the starting position after one full rotation of the shaft 13.

As can be seen from FIG. 5, sensors B1 to Bn, which detect whether a sausage portion is present in the region of the carriage plates, are located in the region of the respective carriage plates 14. For the sensors, any type of sensor can be used which is suitable of detecting the presence of a sausage portion. These may be for example: optical, mechanical, capacitive, image processing or ultrasound sensors.

In the embodiment illustrated in FIGS. 1 and 5 the single sausages or sausage portions are transported further in a row with three sausage portions (n=3), wherein three carriage plates 14 are provided (n=3). The number of the sensors B depends on the number n of sausage portions n which are pushed one after the other from the accelerating belt 8 and are to be passed in a row.

Figure 3:
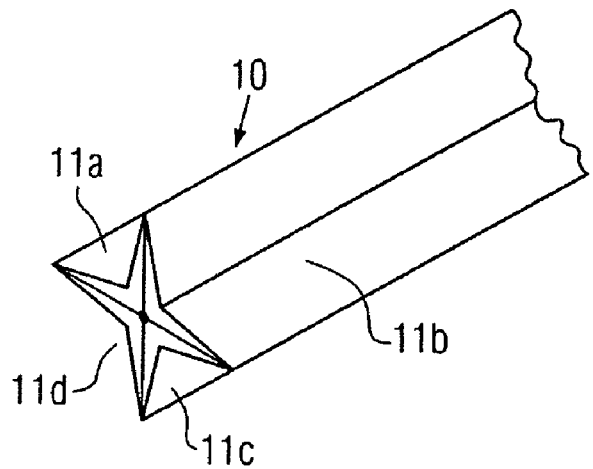
FIG. 3 shows a perspective illustration of the drum magazine.

Furthermore, the device comprises a magazine 10, here a drum magazine 10, which is illustrated in more detail in FIGS. 1 and 3. The drum magazine 10 has the task of accepting the sausage portions 1, which are spaced with the rotary transfer vane 12 and are brought into a defined position in the transport direction, and of transferring them, for example onto a further conveyor belt 16, as is illustrated in FIG. 5 or of transferring them into appropriate trays, etc.

As can be seen from FIG. 3, the drum magazine here comprises a number of longitudinal grooves 11A, B, C, D which serve to accommodate the sausage portions 1. In FIG. 1 the longitudinal groove 11A can be seen on the front side, whereas the longitudinal groove 11C faces the accelerating belt 8 such that the sausage portion 1 is pushed sideways from the accelerating belt 8 into the longitudinal groove 11B by the rotary transfer vane 12 where it can be securely held by the groove. Also the drum magazine 10 is arranged for rotation about its longitudinal axis and can further convey the accepted sausage portion 1 with further rotation. This has the advantage in that the drum magazine 10 can be positioned very closely above the further conveyor belt 16 or the trays. Due to the short transfer path, the sausage portions are transferred in a controlled manner and are only subjected to a free fall over a very short distance. The number of magazine positions, i.e. the length of the longitudinal grooves, and the number of the longitudinal grooves in the drum magazine can be changed depending on the sausage calibre and the required capacity. The drum magazine 10 can be driven by a servo drive or similar type of drive M3 which operates in steps.

The device is, as can be seen from FIG. 1, arranged on a housing 17 which contains a controller for the accelerating device 8 as well as the transfer device 12 and the magazine 10. Furthermore, the housing comprises a display 19 and an entry unit for entering appropriate parameters.

Below the accelerating device 8, i.e. here the accelerating belt 8 or below the drum magazine 10 the following machines can be sited for the further processing of sausage portions: Conveyor belt 16 with or without grouping cartridge as a buffer or removal belt, conveyor belt with grids for smoking or drying equipment, conveyor belt with marshalled trays for the accommodation of the sausages. The conveyor belt is here moved in single cycles until a specified group number (number of rows in a group) has been obtained. On reaching this desired number of sausage portions per group, the conveyor belt carries out a group movement.

For the continuous further processing a wire-grid conveyor belt can also be arranged as the inlet of frying cooking lines below the drum magazine 10. Furthermore, a wire-grid conveyor belt can also be provided as the inlet of cooling or freezing lines. In this respect the conveyor belt continuously accepts the sausages from the drum magazine 10.

Figure 6:
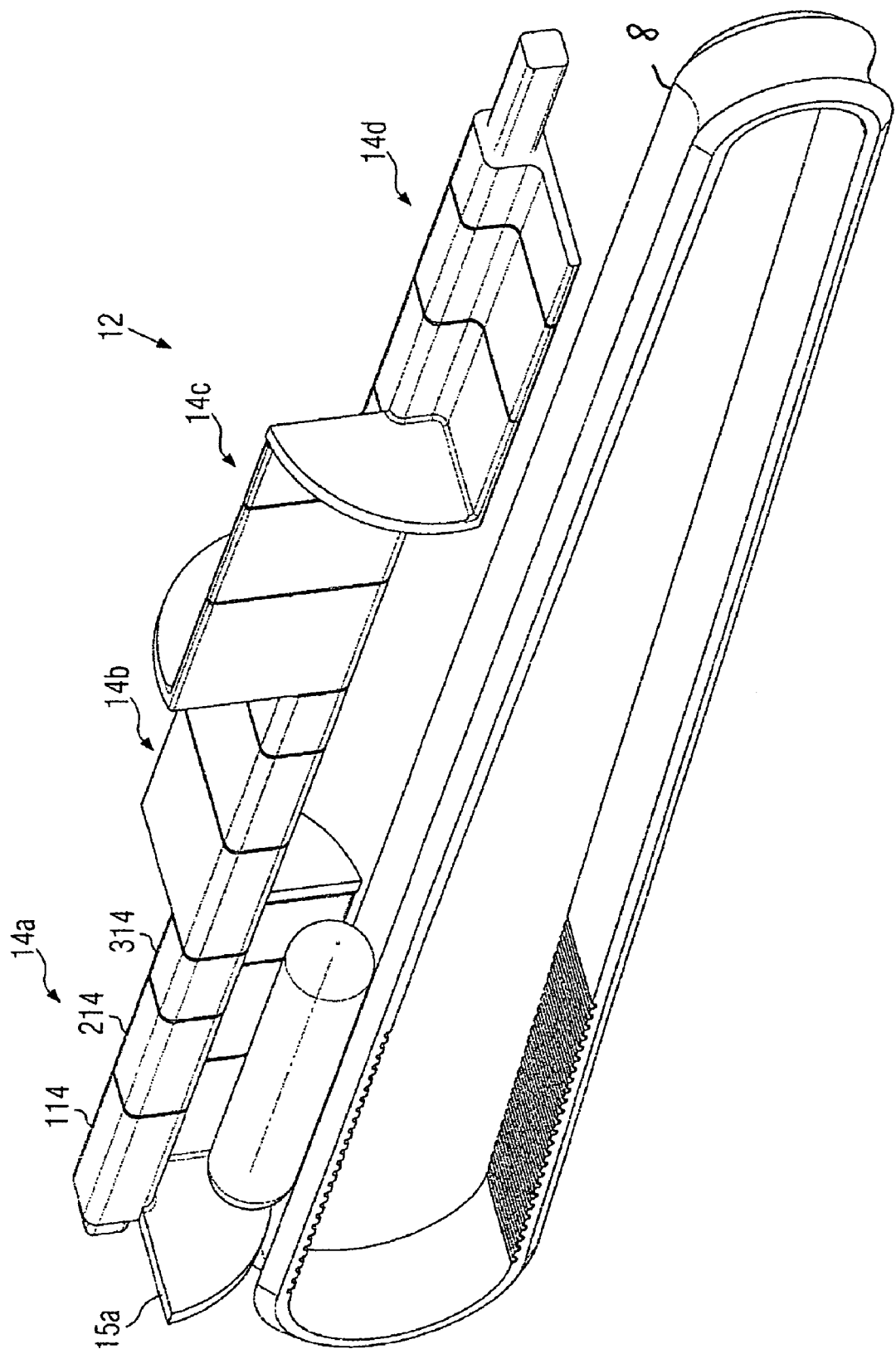
FIG. 6 shows a preferred embodiment of the rotary transfer vane.

FIG. 6 shows a preferred embodiment of the rotary transfer vane 12. Here, the rotary transfer vane 12 comprises for example four carriage plates 14a-d, wherein the number of carriage plates is not restricted to four. According to the preferred embodiment the individual carriage plates 14 are constructed in a number of parts from a number of carrier plate segments 114, 214, 314. The carriage plate segment 114 arranged in the rearmost position in the transport direction comprises an appropriate baffle plate 15a. The other segments 214, 314 have no baffle plate. The carriage plate segment 114, which comprises a baffle plate 15a, is for example 5 cm long, whereas the carriage plate segments 214, 314 without a baffle plate are shorter than the segment 114 and for example exhibit a length of 4 cm. By plugging on a baffle plate, i.e. a carriage plate segment 114 with baffle plate 15a and one or more carriage plate segments 214, 314 without a baffle plate, on the shaft 13 the length of the carriage plate 14 can be easily adapted to the portion length or to the desired deposition position.

In the following the function of the device according to the disclosure is explained in more detail in conjunction with FIGS. 1 to 5.

The sausage portions, in FIG. 5 the single sausage 1, are accepted from the filling machine 2 by the accelerating belt 8, transported in a row and aligned in the direction of the accelerating belt by the belt guide 9 at the side. Since here the accelerating belt 8 runs at least sometimes faster than the transport device 7 of the filling machine 2, which has produced the sausage portion, a gap 20 arises between the individual sausage portions 1 or at the parting points of the sausage portions. Along the rotary transfer vane 12 there are, as previously described, the sensors B1, B2, B3, which can be adjusted in their position and which detect the presence of a sausage portion. The position of the sensors B1, B2, B3 is set such that the sensors B1, B2 and B3 are located in the region (A, B, C) of the corresponding carriage plates 14.

When the first sausage portion 1 arrives via the accelerating belt 8 and reaches the baffle plate 15A (position A), it is held by the baffle plate 15A and brought into an exact first position. When the first sensor B1 responds, first the accelerating belt 8 is briefly retarded and then the rotary transfer vane 12 rotates by a division, here for example 120°, so that the sausage portion can be pushed from the carriage plate 15A onto the drum magazine 10. By rotating the shaft 13 by a division the carriage plate 14B or the baffle plate 15B is then located in place at position B to bring a further following sausage portion in position with the baffle plate 15B. When the second sensor B2 responds, the rotary transfer vane 12 rotates again by one division and pushes the second sausage portion from the accelerating belt 8, whereupon the third carriage and baffle plates 14C, 15C are then in position at the location C. This procedure is repeated until the desired number of sausage portions which are to be transferred in a row have been pushed from the belt. This means that when the nth incoming sausage portion 1 is pushed from the belt at a point located before the n-1th position in the transport direction of the accelerating belt 8, the first carriage plate 14A is again located in the starting position. The number of sensors Bn depends on the number of sausage portions n which are to be transferred consecutively onto the drum magazine 10.

When the shaft 13 has rotated once, this means that n sausage portions have been transferred onto the drum magazine 10, the drum magazine 10 rotates by one division and the sausage portions placed on it are for example transferred to the following conveyor belt 16. The subdivision of the drum magazine 10 depends on the number of longitudinal grooves 11. With four longitudinal grooves, as shown in FIG. 3, the drum magazine 10 then rotates by 90° (1 division=360°/number of longitudinal grooves). Thus, the drum magazine 10 can pass on a row with n sausage portions, here with three sausage portions.

If it is found by a sensor C4 in the front region of the accelerating belt 8 that a sausage is defective, then it can be sorted out by an ejection device (air or motorised drive). The rest of the method is not affected by the ejection of the defective sausage portion, because the shaft 13 only turns further when an appropriate sensor B1 to Bn indicates that a sausage portion is located in the region of the corresponding carriage 14.

When therefore a sausage row, consisting of n sausage portions, has been transferred from the drum magazine 10 to the further conveyor device 16, the further conveyor device 16 can again move by one sausage width. The conveyor belt 16 can however also continue to remain stationary and only then move when more rows have been transferred from the drum magazine 10.

The conveyor belt 16 can be equipped with cartridges, which are designed in their size for the projected group number (number of rows each with n sausage portions). Alternatively, depending on the use, a plain conveyor belt can also be employed.

As mentioned, the conveyor belt is moved further by one sausage width after the transfer of each accepted sausage row. Once the desired group size is reached, the conveyor belt 16 is moved forwards to the start of the next group. To do this, the conveyor belt 16 is moved until for example a proximity switch mounted at the side detects the web (alternatively chain conveyor belts with a sprocket drive can be employed). With plain conveyor belts (without cartridges) a specified distance is covered. At the end of the conveyor belt 16 the sausages or sausage chains are transferred to a grid or to trays. Also manual removal of sausage groups from the conveyor belt 16 is conceivable to save the operator from having to count the portions during removal.

A certain group comprises a predetermined number of rows. The provision of trays or containers on the conveyor belt is also possible. Here, many rows each with n sausage portions are transferred from the drum magazine 10 onto n trays or into containers before the trays or containers are transported away. The drum magazine 10 rotates repeatedly until the desired number of sausage portions have been accepted into the corresponding containers. The containers are here arranged below the drum magazine 10 such that the individual n sausage portions can each be transferred onto the tray or into the container. If, for example, with the embodiment illustrated in FIG. 1 ten sausages are transferred to each of three containers, then the shaft 13 must rotate a total of ten times so that the carriage plates 14a, b, c can each push a sausage portion 1 ten times from the accelerating belt 8. Also the drum magazine 10 must rotate by one division a total of ten times so that a group number of ten is obtained in the individual containers.

The functions of the accelerating device 8, the transfer device 12 and the drum magazine are coordinated by the controller 17.

I claim:

1. Device for the ordered deposition of parted sausage portions (1) from a filling machine (2), comprising:
   an accelerating device (8) which accepts the sausage portions (1) in a row from the filling machine (2); and
   a transfer device (12) which pushes the individual sausage portions (1) at defined points sideways from the accelerating device (8), wherein the transfer device (12) comprises a rotary transfer vane (12), on the shaft (13) of which at least one carnage plate (14) is mounted, which carriage plate (14) pushes the sausage portion sideways from the accelerating device (8).

2. Device according to claim 1, wherein the accelerating device (8) comprises an accelerating belt (8), which one of runs faster than a transport device (7) of the filling machine or which, during the transfer of a sausage portion (1) or parting point between two sausage portions (1), briefly runs faster such that a gap (20) arises between the individual sausage portions.

3. Device according to claim 1, wherein the accelerating device (8) exhibits a guide (9) at the side.

4. Device according to claim 1, wherein on the rear end of the carriage plate (14) in the transport direction T in each case one baffle plate (15) is arranged, which baffle plate (15) essentially extends perpendicular to the transport direction T.

5. Device according to claim 4, wherein the carnage plates and baffle plates (14, 15) are mounted onto the shaft (13) so that they are replaceable.

6. Device according to claim 5, wherein the carriage plates and baffle plates (14, 15) are mounted by pushing onto the shaft (13).

7. Device according to claim 1, wherein the number n of the carriage plates (14) corresponds to the number of sausage portions n, which are to be transferred consecutively in a row from the accelerating device (8) by the transfer device (12), wherein the carriage plates are arranged distributed behind one another uniformly over the circumference of the shaft (13) in the transport direction T.

8. Device according to claim 1, and a sensor (B1, B2) for each carriage plate (15), which sensor (B1, B2) detects the presence of a sausage portion (1) in the region of the carriage plate (15).

9. Device according to claim 1, and following the transfer device (12) a conveyor belt (16) is arranged which moves perpendicular to the transport direction of the accelerating device (12).

10. Device according to claim 1, wherein the carriage plate 14 is formed from many carriage plate segments (114, 214, 314) which are pushed onto the shaft 13.

11. Device according to claim 10, wherein one of the carriage plate segments (114) comprises a baffle plate (15a).

12. Device for the ordered deposition of parted sausage portions (1) from a filling machine (2), comprising:
- an accelerating device (8) which accepts the sausage portions (1) in a row from the filling machine (2);
- a transfer device (12) which pushes the individual sausage portions (1) at defined points sideways from the accelerating device (8); and
- a drum magazine (10) to accept the sausage portions (1) which are pushed sideways from the accelerating device (8).

13. Device according to claim 12, wherein the drum magazine comprises a number of longitudinal grooves (11) distributed around the circumference for accepting the sausage portions (1).

14. Method for the ordered deposition of sausage portions (1), comprising
- parting separately the filled parted sausages into sausage portions (1);
- accepting the sausage portions by an accelerating device (8) for further transportation; and
- pushing the sausage portions at defined points sideways from the accelerating device (8) with a transfer device (12),
- wherein the transfer device (12) comprises a rotary transfer vane (12), on the shaft (13) of which at least one carriage plate (14) is mounted, which carriage plate (14) pushes the sausage portion sideways from the accelerating device (8).

15. Method according to claim 14, wherein the accelerating device (8) one of runs faster than a transport device of the filling machine (2), or which during the transfer of a sausage portion or parting point between two sausage portions (1) runs faster such that a gap arises between the sausage portions.

16. Method according to claim 14 wherein the sausage portions (1) accepted by the accelerating device (8) are aligned in the transport direction of the accelerating device (8).

17. Method according to claim 14, and when n sausage portions (1) are to be transferred in a row, of n sausage portions consecutively incoming on the accelerating device (8), initially pushing sideways the first incoming sausage portion $n_1$ at a first point (A) of the accelerating device (8), and then pushing the nth incoming sausage portion (1) at an nth position (B, C), which is located before the n-1th position in the transport direction of the accelerating device (8).

18. Method according to claim 17, and pushing the sausage portions (1) from the accelerating device by the rotary transfer vane (12) which comprises n carriage plates (14), which carriage plates (14) are consecutively distributed uniformly over the circumference of the shaft (13) of the rotary transfer vane (12) in the transport direction and are positioned such that by rotating the shaft (13) the carriage plates (14) push the consecutively following sausage portions (19) one after the other from the accelerating device (8) at the n positions (A, B, C).

19. Method for the ordered deposition of sausage portions (1), comprising:
- parting separately the filled parted sausages into sausage portions (1);
- accepting the sausage portions by an accelerating device (8) for further transportation; and
- pushing the sausage portions at defined points sideways from the accelerating device (8),
- wherein the sausage portions (I) are transferred by the accelerating device (8) into a drum magazine (10).

20. Method according to claim 19, and when n sausage portions are to be transferred in a row, pushing n sausage portions from the accelerating device (8) onto a longitudinal groove (11) of the drum magazine (10), whereupon the drum magazine (10) rotates to transfer the n sausage portions in a row, wherein after the rotation a new longitudinal groove (11) stands ready to accept the next sausage portions (1).

* * * * *

UNITED STATES PATENT AND TRADEMARK OFFICE
CERTIFICATE OF CORRECTION

PATENT NO. : 7,258,604 B2
APPLICATION NO. : 11/400415
DATED : August 21, 2007
INVENTOR(S) : Siegfried Reutter It is certified that error appears in the above-identified patent and that said Letters Patent is hereby corrected as shown below:

On the Title Page:

Item (30), "05007894" should be -- 05007894.8 --.

At Column 8, line 29, "carnage" should be -- carriage --.

At Column 8, line 46, "carnage" should be -- carriage --.

Signed and Sealed this

Twenty-fifth Day of March, 2008

JON W. DUDAS
*Director of the United States Patent and Trademark Office*